United States Patent
Kim et al.

(10) Patent No.: US 7,359,638 B2
(45) Date of Patent: Apr. 15, 2008

(54) OPTICAL SOURCE GENERATOR FOR WAVELENGTH DIVISION MULTIPLEXING OPTICAL COMMUNICATION SYSTEMS

(75) Inventors: Jong-Kwon Kim, Taejonkwangyok-shi (KR); Yun-Je Oh, Yongin-shi (KR); Seong-Taek Hwang, Pyongtaek-shi (KR)

(73) Assignee: Samsung Electronics Co., Ltd., Maetan-Dong, Yeong Tong-Gu, Suwon-Si, Gyeonggi-Do (KR)

( * ) Notice: Subject to any disclaimer, the term of this patent is extended or adjusted under 35 U.S.C. 154(b) by 704 days.

(21) Appl. No.: 10/621,589

(22) Filed: Jul. 17, 2003

(65) Prior Publication Data

US 2004/0042794 A1    Mar. 4, 2004

(30) Foreign Application Priority Data

Aug. 14, 2002   (KR) ................. 10-2002-0048186

(51) Int. Cl.
   *H04J 14/02* (2006.01)
(52) U.S. Cl. .................. 398/92; 398/79; 398/200; 398/201; 372/6
(58) Field of Classification Search ............... None
   See application file for complete search history.

(56) References Cited

U.S. PATENT DOCUMENTS

| | | | | |
|---|---|---|---|---|
| 5,646,951 A * | 7/1997 | Fischer et al. | ................. | 372/19 |
| 6,100,831 A * | 8/2000 | Frankel | ................. | 341/137 |
| 6,473,540 B1 * | 10/2002 | Augustsson | ................. | 385/15 |
| 6,728,274 B1 * | 4/2004 | Sousa et al. | ................. | 372/20 |
| 6,920,261 B2 * | 7/2005 | Inada et al. | ................. | 385/24 |
| 6,950,571 B1 * | 9/2005 | Hughes et al. | ................. | 385/24 |
| 2002/0012378 A1 * | 1/2002 | Zenteno | ................. | 372/108 |
| 2002/0126372 A1 * | 9/2002 | Shimomura et al. | ..... | 359/341.1 |
| 2002/0164125 A1 * | 11/2002 | Berger et al. | ................. | 385/39 |
| 2002/0167721 A1 * | 11/2002 | Caplan | ................. | 359/347 |
| 2002/0176451 A1 * | 11/2002 | Lee et al. | ................. | 372/6 |
| 2002/0196528 A1 * | 12/2002 | Jolley et al. | ............. | 359/337.1 |
| 2003/0012232 A1 * | 1/2003 | Musk | ................. | 372/23 |
| 2003/0048507 A1 * | 3/2003 | Shimomura et al. | ........ | 359/128 |
| 2003/0179998 A1 * | 9/2003 | Zhang et al. | ................. | 385/37 |
| 2003/0210730 A1 * | 11/2003 | Tomaru et al. | ................. | 372/101 |
| 2003/0214703 A1 * | 11/2003 | Ovadia et al. | ............. | 359/344 |
| 2004/0086004 A1 * | 5/2004 | Bonaccini et al. | ............. | 372/6 |

FOREIGN PATENT DOCUMENTS

| | | |
|---|---|---|
| JP | 07-297468 | 11/1995 |
| JP | 08-162697 | 6/1996 |
| JP | 11-087815 | 3/1999 |
| JP | 2002-185402 | 6/2002 |

* cited by examiner

Primary Examiner—Kenneth Vanderpuye
Assistant Examiner—Thi Q. Le
(74) Attorney, Agent, or Firm—Cha & Reiter, LLC

(57) ABSTRACT

An optical source generator for wavelength-division-multiplexing optical communication systems includes a wavelength-division multiplexer/demultiplexer, optical amplifiers, and wavelength-dependent reflectors such as optical fiber-Bragg gratings or wavelength-independent reflectors such as mirrors, so as to form laser resonant cavities. Lasing of the optical fibers therefore generates spontaneously emitted lights. Further, the optical source generator controls each reflectance of the respective wavelength-dependent or independent reflectors so that lights amplified within the laser resonant cavities can be used as multi-wavelength optical sources or independent optical sources.

13 Claims, 4 Drawing Sheets

OPTICAL SOURCE GENERATOR FOR WAVELENGTH DIVISION MULTIPLEXING OPTICAL COMMUNICATION SYSTEMS

CLAIM OF PRIORITY

This application claims priority to an application entitled "OPTICAL SOURCE GENERATOR FOR WAVELENGTH DIVISION MULTIPLEXING OPTICAL COMMUNICATION SYSTEMS," filed in the Korean Intellectual Property Office on Aug. 14, 2002 and assigned Serial No. 2002-48186, the contents of which are hereby incorporated by reference.

BACKGROUND OF THE INVENTION

1. Field of the Invention

The present invention relates to an optical source generator for wavelength-division-multiplexing (WDM) optical communication systems.

2. Description of the Related Art

Recent research has actively focused on increasing transmission capacity in an optical field through the use of a multi-channel optical source that is subject to WDM. In WDM, each optical signal to be transmitted is allocated a respective wavelength so that multiple signals can flow simultaneously on a single channel. Currently, a semiconductor laser is generally used as the optical source of the transmitter in a WDM optical communication system. However, the semiconductor laser optical source needs precise wavelength control to operate at a wavelength recommended by the International Telecommunication Union (ITU) and to allow the output wavelength to be subject to temperature control. If a multi-channel optical source is required, the number of wavelengths to be controlled increases, which complicates the controlling operation. In addition, if a multiplexed multi-channel optical source is needed, so is a separate multiplexer.

To solve these problems, a multi-wavelength laser optical source generator has recently been developed which employs a plurality of fiber-Bragg gratings (FBGs) and erbium-doped fiber amplifiers (EDFAs).

FIG. 1 shows a conventional multi-wavelength laser optical source generator. It is designed with fiber-Bragg gratings 4A, 4B, and 4C which are each configured to transmit a wavelength that meets ITU recommendations. The optical source generator is further configured with erbium-doped optical fiber amplifiers 3A, 3B, and 3C that are each interposed between the fiber-Bragg gratings 4A, 4B, and 4C or vice versa. A single pump laser is used for optical fiber amplification. As shown in FIG. 1, the optical source generator also includes a pump laser 1, a wavelength-division multiplexer/demultiplexer 2, an attenuator 6, and a polarization controller 8.

As seen from FIG. 1, spontaneously emitted lights generated from the optical fiber amplifiers 3A, 3B, and 3C are primary-reflected by means of the fiber-Bragg gratings 4A, 4B, and 4C, and then secondary-reflected by a mirror 5 to the left of the fiber-Bragg gratings 4A, 4B, and 4C. The secondary-reflected lights are then tertiary-reflected by the fiber-Bragg gratings 4A, 4B, and 4C. Accordingly, the spontaneously emitted lights may be subject to numerously repetitive lasing. Consequent gains by means of optical fiber amplifiers 3A, 3B, and 3C allow subsequent use of the lights as laser optical sources. Each of the optical fiber amplifiers 3A, 3B, and 3C is situated in the corresponding wavelength-compatible resonant cavity among those resonant cavities that are defined between the fiber-Bragg gratings 4A, 4B, and 4C and the mirror 5. For example, in FIG. 1, an optical source having a wavelength of $\lambda_1$ is subjected to lasing between the first fiber-Bragg grating 4A and the mirror 5 and makes use of the first erbium-doped fiber amplifier 3A as an amplifier medium. Similarly, an optical source having a wavelength of $\lambda_2$ is subjected to lasing between the second fiber-Bragg grating 4B and the mirror 5 and makes use of the first erbium-doped optical fiber amplifier 3A and the second erbium-doped optical fiber amplifier 3B. The respective single wavelength optical sources generated in this way make use of the same optical fiber amplifiers and mirror so that they are multiplexed and reflected. Therefore, these multiplexed optical sources are extracted by a coupler 7 disposed between the mirror 5 and the fiber-Bragg gratings 4A, 4B, and 4C.

However, in the multi-wavelength optical source generator according to the prior art as mentioned above, a single amplifier can be shared by a plurality of optical sources. Consequently, operation of the amplifier within a saturation region to achieve high output for one channel may lead to a change in gain of another channel, which can cause each optical source power to fluctuate unstably. Moreover, as a plurality of generated and multiplexed optical sources are extracted through the coupler, generally only the use of multiplexed optical sources is feasible. It is difficult to apply conventional multi-wavelength optical source generators to optical communication systems that employ individual optical sources.

SUMMARY OF THE INVENTION

Thus, there exists a need to provide an optical source generator for wavelength-vision-multiplexing optical communication systems in which either single wavelength or multiplexed optical sources can be generated stably. In preferred embodiments of the resent invention, the need is met through the use of passive elements like reflectors.

An optical source generator for wavelength-division-multiplexing optical communication systems according to a first preferred embodiment of the present invention comprises: a pumping-light generation section for generating and outputting pumping lights; a wavelength-division multiplexer/demultiplexer, provided with one multiplexing port and a plurality of demultiplexing ports, for wavelength-division-multiplexing and outputting optical signals inputted into the multiplexing port or for wavelength-division demultiplexing and outputting optical signals inputted into the demultiplexing ports; an optical path converter for outputting the pumping lights generated and received from the pumping light generation section to the multiplexing port of the wavelength-division multiplexer/demultiplexer by converting a path of the pumping lights, and for outputting optical signals outputted from the multiplexing port of the wavelength-division multiplexer/demultiplexer through converted paths for the optical signals; a plurality of wavelength-dependent reflectors, each connected to one of the respective demultiplexing ports of the wavelength-division multiplexer/demultiplexer, for reflecting only optical signals that have a particular wavelength that corresponds to one of the respective demultiplexing ports; a plurality of optical fiber amplifiers, each having two sides one side of which is connected to one associated with the wavelength-dependent reflectors, for generating spontaneously emitted lights in response to pumping lights generated from the pumping-light generation section; and a plurality of wavelength-independent reflectors, each connected to the other side of a respective one of the optical fiber amplifiers, for reflecting all optical signals including said optical signals that have a particular wavelength.

Preferably, each reflectance oft he wavelength-dependent reflectors and each reflectance of the wavelength-independent reflectors are controlled independently, thereby allowing either unilateral or bilateral transmission from the optical sources through the respective reflectors.

An optical source generator for wavelength-division-multiplexing optical communication systems according to a second preferred embodiment of the present invention comprises: a wavelength-division multiplexer/demultiplexer, provided with one multiplexing port and a plurality of demultiplexing ports, for wavelength-division-multiplexing and outputting optical signals inputted into the multiplexing port, and for wavelength-division-demultiplexing and outputting optical signals inputted into the demultiplexing ports; a pumping-light generation section for generating and outputting pumping lights; an optical path converter having a first port for inputting pumping lights generated from the pumping-light generation section, a second port connected to the multiplexing port of the wavelength-division multiplexer/demultiplexer, and a third port for outputting the wavelength-division-multiplexed optical signals; a plurality of wavelength-dependent reflectors, each connected to one of the respective demultiplexing ports of the wavelength-division multiplexer/demultiplexer, for reflecting only optical signals that have a particular wavelength that corresponds to one of the respective demultiplexing ports; a plurality of optical fiber amplifiers, each having two sides one of which is connected to one of the associated wavelength-dependent reflectors, for generating spontaneously emitted lights in response to pumping lights generated from the pumping-light generation section; a first plurality of wavelength-independent reflectors, each connected to the other side of one of the respective optical fiber amplifiers, for reflecting all optical signals including said optical signals that have a particular wavelength; an optical-band pass filter, having two sides one of which is connected to the third port of the optical path converter, for passing through only the optical source bands; and a second plurality of wavelength-independent reflectors, each connected to the other side of the optical-band pass filter, for reflecting all optical signals including said optical signals that have a particular wavelength.

Preferably, each reflectance of the first and second wavelength-dependent reflectors is controlled independently, thereby enabling the optical sources to be transmitted through the respective reflectors unilaterally or bilaterally.

BRIEF DESCRIPTION OF THE DRAWINGS

The above and other features and advantages of the present invention will be more apparent from the following detailed description taken in conjunction with the accompanying drawings, in which the same or similar parts have like reference numbers to the extent feasible throughout the various views.

DETAILED DESCRIPTION OF THE PREFERRED EMBODIMENT

An optical source generator according to the present invention includes a wavelength-division multiplexer/demultiplexer such as an arrayed wave-guide grating, optical amplifiers, and wavelength-dependent reflectors such as optical fiber-Bragg gratings or wavelength-independent reflectors such as mirrors, so as to form laser-resonant cavities. As a result, lights can be spontaneously emitted from the optical fiber amplifiers to be lased. Further, the optical source generator of the present invention regulates each reflectance of the wavelength-dependent or independent reflectors so that lights amplified within the laser resonant cavities can be used as multi-wavelength optical sources or single wavelength optical sources.

Figure 1:
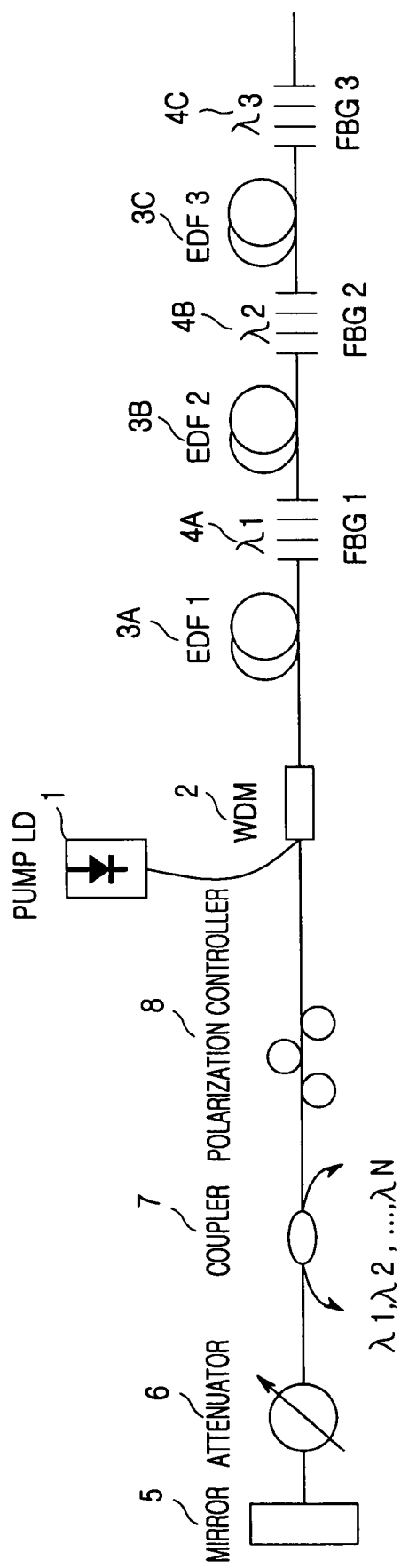
FIG. 1 is a schematic diagram illustrating a multi-wavelength laser optical source generator according to the prior art.
Figure 2:
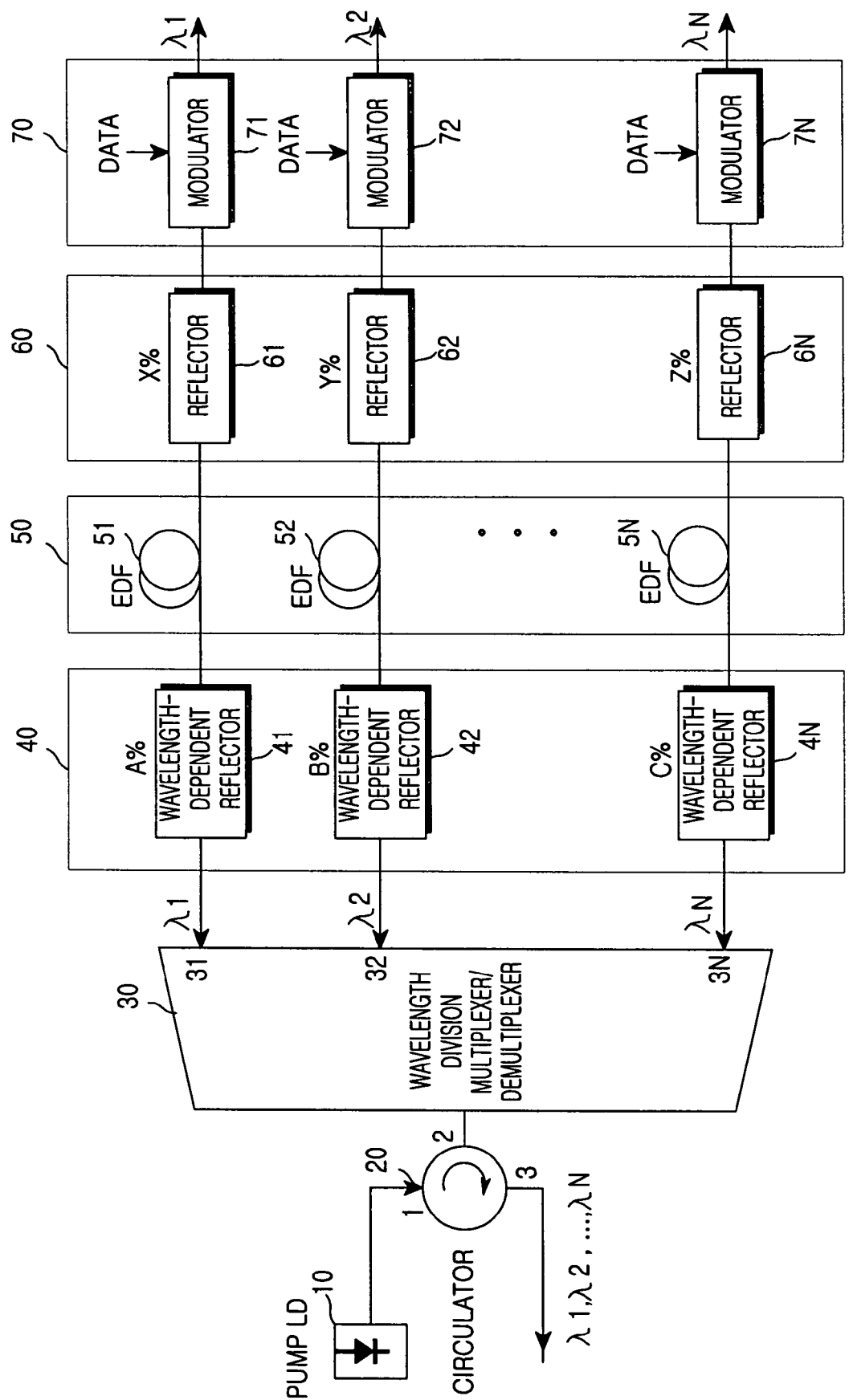
FIG. 2 is a schematic diagram illustrating an exemplary optical source generator for wavelength-division-multiplexing optical communication systems according to a first embodiment of the present invention.

FIG. 2 illustrates, by way of non-limiting example, a preferred optical source generator for wavelength-division-multiplexing optical communication systems according to a first embodiment of the present invention.

As shown in FIG. 2, an optical source generator of wavelength-division-multiplexing optical communication systems according to a first embodiment of the present invention includes a pump laser diode 10, a three terminal optical circulator 20, a wavelength-division multiplexer/demultiplexer 30, a wavelength-dependent reflector section 40, an optical fiber amplifier section 50, a wavelength-independent reflector section 60, and a modulator section 70.

The pump laser diode 10 is connected to a terminal 1 of the three-terminal optical circulator 20 to deliver pumping lights to the optical fiber amplifier section 50. Pumping lights emitted from the pump laser diode 10 are introduced through the terminal 1 of the optical circulator 20 into a multiplexing port of the wavelength-division multiplexer/demultiplexer 30. The multiplexed port is connected to a terminal 2 of the optical circulator 20. Optical circulator 20 allocates paths to input/output lights and may employ a coarse-wavelength-division-multiplexing (CWDM) filter.

The wavelength-division multiplexer/demultiplexer 30 has N demultiplexing ports 31, 32, . . . 3N. Each port is provided with a wavelength-dependent reflector section 40 having a reflective property compatible with a pass wavelength of the wavelength-division-multiplexer/demultiplexer, the optical fiber amplifier section 50 and the wavelength-independent reflector section 60 such as a mirror.

The wavelength-division multiplexer/demultiplexer 30 acts to multiplex and output a plurality of input channels (or wavelengths), or to demultiplex and output input optical signals to each respective channel (or wavelength). The wavelength-division multiplexer/demultiplexer 30 can employ a n N*1 arrayed wave-guide grating (AWG) having N input terminals and one output terminal, or an 1*N AWG having one input terminal and N output terminals. As with a typical optical element, the AWG may be used as a multiplexer or a demultiplexer due to its reversibility.

Pumping lights which are inputted into the multiplexing port of the wavelength-division multiplexer/demultiplexer 30 are spectrum-split in the wavelength-division multiplexer/demultiplexer 30 and then inputted into the wavelength-dependent reflectors 41, 42, . . . 4N which are connected to the corresponding demultiplexing ports 31, 32, . . . 3N, respectively.

In the wavelength-dependent reflectors 41, 42, . . . 4N, only lights having a particular wavelength are reflected back toward the optical fiber amplifiers 51, 52, . . . 5N. The other lights having a different wavelength band pass through the wavelength-dependent reflectors 41, 42, . . . 4N without reflection and are eliminated, because they are not within a pass band of the wavelength-division multiplexer/demultiplexer. A fiber-Bragg grating, a reflector with a thin film filter, etc., may be used, for example, as a wavelength-dependent reflector.

The optical fiber amplifiers 51, 52, . . . 5N generate spontaneously emitted lights from the pumping lights which are inputted through the wavelength-dependent reflectors 41, 42, . . . 4N. The optical fiber amplifier is manufactured by doping rare-earth ions such as erbium (Er), praseodymium (Pr), neodymium (Nd) or the like to an active optical fiber. When pumping lights of a particular wavelength are transmitted into this optical fiber, stimulated photons having a particular wavelength are emitted by excitation of the rare-earth ions. As a result, optical signals transmitted through the corresponding optical fiber are amplified.

The spontaneously emitted lights generated from the optical fiber amplifiers 51, 52, . . . 5N are reflected by the wavelength-independent reflectors 61, 62 . . . 6N and amplified in the optical fiber amplifiers 51, 52, . . . 5N again. By repeating this process, lights selected between the wavelength-dependent reflectors 41, 42, . . . 4N and the wavelength-independent reflectors 61, 62, . . . 6N are lased and used as optical sources. To make use of these lights in the optical communication system, the wavelength-dependent reflector section 40 is set to have a reflectance of A %, and the wavelength-independent reflector section 60 is set to have a reflectance of X %. By design, therefore, a predetermined part of the optical power can be bilaterally transmitted. For example, when the wavelength-dependent reflector section 40 and the wavelength-independent reflector section 60 are each set for a reflectance of 80%, 80% of the light is reflected and thus continues to be amplified within resonant cavities between the wavelength-dependent reflectors 41, 42, . . . 4N and the wavelength-independent reflectors 61, 62, . . . 6N while the other 20% of the light passes through in the opposite direction for use as a respective optical source.

On one side of the wavelength-division multiplexer/demultiplexer 30 are disposed modulators 71, 72, . . . 7N, each of which can be used as an individual optical source. Generated lights are inputted into the N demultiplexing ports 31, 32, . . . 3N of the wavelength-division multiplexer/demultiplexer 30, multiplexed, inputted into the terminal 2 of the optical circulator 20 which is connected to the multiplexing port of the wavelength-division multiplexer/demultiplexer 30, and then outputted to the terminal 3 of the optical circulator 20. At this time, the output lights are outputted to various ones of the wavelengths λ1, λ2, λ3, . . . λN. Lights of other wavelength bands have already been multiplexed. Therefore, each of the multi-wavelength optical sources of the present invention can be used as a single wavelength optical source or a multiplexed optical source.

Figure 3:
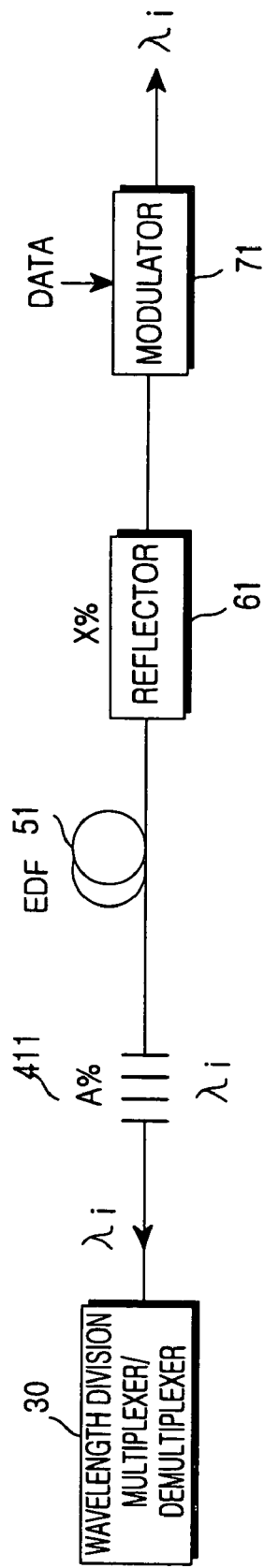
FIG. 3 is a schematic diagram illustrating, by way of example, an embodiment that employs fiber-Bragg gratings in implementation of the wavelength-dependent reflectors of FIG. 2 and, in particular, only a single of the multiplexed wavelength channels is shown; and, FIG. 4 is a schematic diagram illustrating an exemplary optical source generator for wavelength-division-multiplexing optical fiber communications systems according to a second embodiment of the present invention.

FIG. 3 illustrates, by way of non-limiting example, a preferred embodiment of the present invention that employs fiber-Bragg gratings in implementation of the wavelength-dependent reflectors in FIG. 2. Merely a single of the multiplexed wavelength channels is shown.

Figure 4:
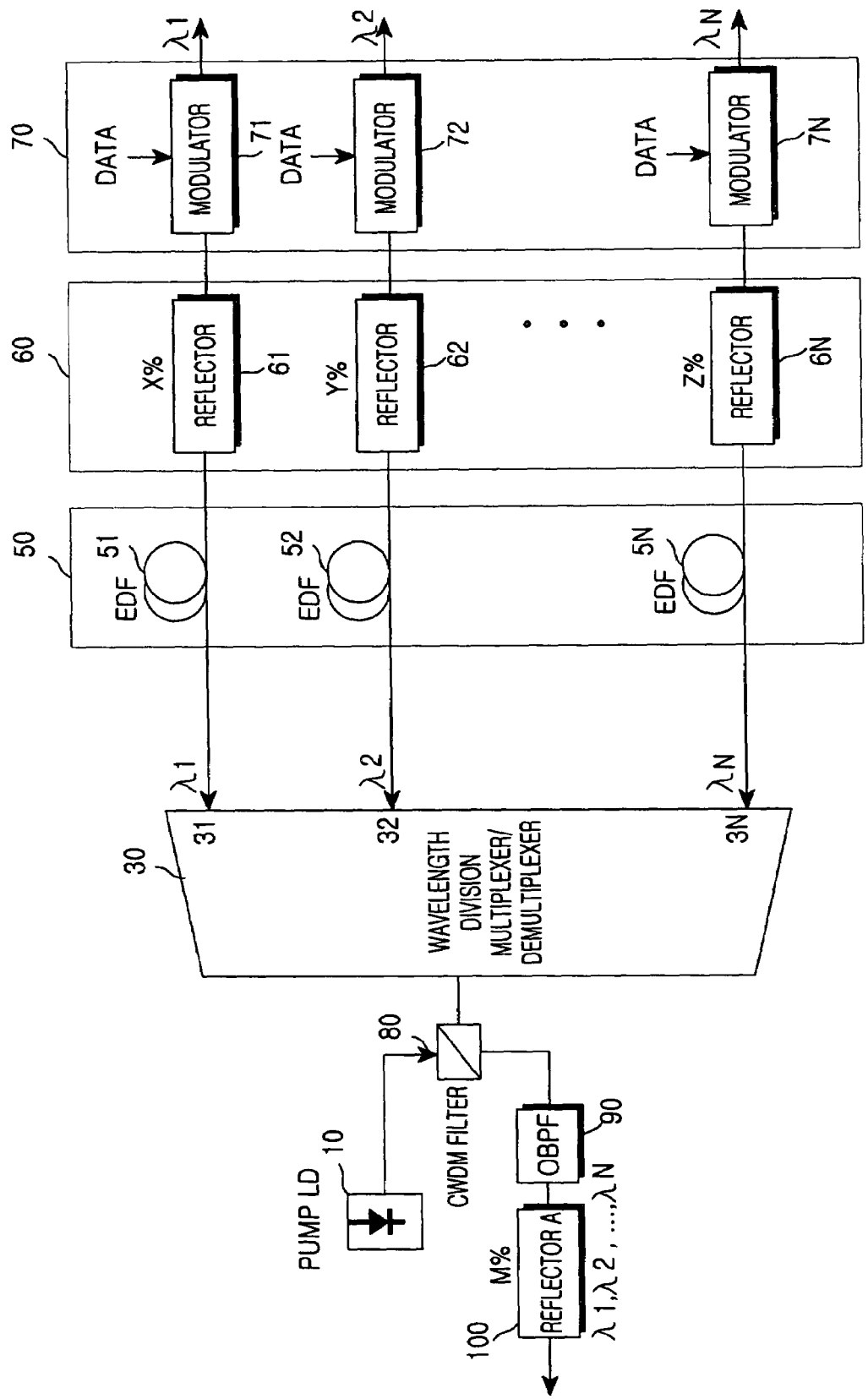

In FIG. 3, a demultiplexing port of a wavelength-division multiplexer/demultiplexer 30 is provided with a fiber-Bragg grating 411, an optical fiber amplifier 51, a wavelength-independent reflector 61 and a modulator 71. Modulator 71 is provided, which can be used as an individual optical source. The fiber-Bragg grating 411 is designed with a transmission property identical to that of wavelength-division multiplexer/demultiplexer 30, thereby enabling generated lights to be transmitted bilaterally. Further, to make use of generated lights in the optical communication system, the fiber-Bragg grating as the wavelength-dependent reflector is set to have a reflectance of A %, and the wavelength-independent reflector is set to have a reflectance of X %. By design, therefore, a predetermined part of optical power can be transmitted in opposite directions. FIG. 4 illustrates, by way of non-limiting example, a preferred optical source generator for wavelength-division-multiplexing optical fiber communications systems according to a second embodiment of the present invention.

As shown in FIG. 4, an optical source generator for wavelength-division-multiplexing optical fiber communication systems according to a second embodiment of the present invention includes a pump laser diode 10; a wavelength-division multiplexer/demultiplexer 30; optical fiber amplifiers 51, 52, . . . 5N, wavelength-independent reflectors 61, 62, . . . 6N, 100; modulators 71, 72, . . . 7N; a coarse-wavelength-division-multiplexing (CWDM) filter 80; and an optical band pass filter (OBPF) 90. According to the second embodiment, multi-wavelength optical sources can be realized using wavelength-independent reflectors. The second embodiment differs from the first embodiment in that single wavelength resonant cavities are established for the wavelength-independent reflector 100, which is connected to a multiplexing port of the wavelength-division multiplexer/demultiplexer 30, in combination with wavelength-independent reflectors 61, 62, . . . 6N, which are connected to demultiplexing ports 31, 32, . . . 3N of the wavelength-division multiplexer/demultiplexer 30. The CWDM filter 80 may be replaced also with the optical circulator as described in the first embodiment.

Pumping lights generated and emitted from the pump laser diode 10 are inputted into the multiplexing port of the wavelength-division multiplexer/demultiplexer 30. The inputted pumping lights are spectrum-split in the wavelength-division multiplexer/demultiplexer 30 and then inputted into the optical fiber amplifiers 51, 52, . . . 5N, each of which is connected to the demultiplexing ports 31, 32, . . . 3N, respectively.

The optical fiber amplifiers 51, 52, . . . 5N generate spontaneously emitted lights from the pumping lights inputted through the demultiplexing ports 31, 32, . . . 3N. The optical fiber amplifiers are manufactured by doping rare-earth ions such as erbium (Er), praseodymium (Pr), neodymium (Nd) or the like to an active optical fiber. When pumping lights of a particular wavelength are transmitted into this optical fiber, stimulated photons having a particular wavelength are emitted by excitation of the rare-earth ions. As a result, optical signals transmitted through the corresponding optical fiber are amplified.

The spontaneously emitted lights generated from the optical fiber amplifiers 51, 52, . . . 5N are reflected by the wavelength-independent reflectors 61, 62, . . . 6N, and amplified through the optical fiber amplifiers 51, 52, . . . 5N. The spontaneously emitted lights are then wavelength-division-multiplexed through the wavelength-division multiplexer/demultiplexer 30. The wavelength-division-multiplexed spontaneously emitted lights 80 have a band different from that of the pump laser diode 10 and pass through the CWDM filter 80 and toward the OBPF 90. The OBPF 90 allows only an optical source band to pass through and to then reflect from the wavelength-independent reflector 100. The spontaneously emitted lights reflected by the wavelength-independent reflector 100 pass through the OBPF 90 and the CWDM filter 80 again. They are then multiplexed by the wavelength-division multiplexer/demultiplexer 30 and amplified by the optical fiber amplifiers 51, 52, . . . 5N for respective single wavelengths. By repeating this process many times, the spontaneously emitted lights are lased so that they can be used as optical sources. The OBPF 90 is used to select an AWG transmission band having a periodic property. As with the first preferred embodiment of the present invention described with reference to FIG. 2, the spontaneously emitted lights can be used as single wavelength optical sources or multiplexed optical sources if each reflectance of the wavelength-independent reflectors 61, 62, . . . 6N is controlled for respective single wavelengths and if the reflectance M % of the wavelength-independent reflector 100 for reflecting multiplexed channels is controlled. It is understood that the second embodiment may optionally be augmented with wavelength-dependent reflectors 41, 42, . . . 4N (not shown in FIG. 4) intervening between the demultiplexing ports 31, 32, . . . 3N and the optical fiber amplifiers 51, 52, . . . 5N, as in the first embodiment, to import into the second embodiment structure and functionality of the first embodiment.

While the invention has been shown and described with reference to certain preferred embodiments thereof, it will be understood by one skilled in the art that various modifications may be made therein without departing from the spirit and scope of the invention as defined by the appended claims. Therefore, the present invention is not limited to the disclosed embodiments.

As seen from the foregoing, the optical source generator for wavelength-division-multiplexing optical communication systems according to the present invention can generate stable optical sources using passive elements such as reflectors.

In addition, the optical sources generated by the optical source generator according to the present invention can be used as multiplexed optical sources and individual optical sources. It is therefore possible not only to lower the installation expense but also to provide effective operation in the communication system in which a plurality of optical sources is required.

What is claimed is:

1. An optical source generator for wavelength-division-multiplexing optical communication systems, comprising:

a pumping-light generation section configured to generate and output pumping lights;

a wavelength-division multiplexer/demultiplexer being provided with one multiplexing port and a plurality of demultiplexing ports, being configured to wavelength-division-multiplex and to output optical signals inputted into the multiplexing port, and being configured to wavelength-division-demultiplex and to output optical signals inputted into the demultiplexing ports;

an optical path converter being configured to output the pumping lights generated and received from the pumping-light generation section to the multiplexing port of the wavelength-division multiplexer/demultiplexer by converting a path of the pumping lights and being configured to output optical signals outputted from the multiplexing port of the wavelength-division multiplexer/demultiplexer through converted paths for the optical signals;

a plurality of wavelength-dependent reflectors, each being connected to one of the respective demultiplexing ports of the wavelength-division multiplexer/demultiplexer and each being configured to reflect only optical signals that have a particular wavelength that corresponds to one of the respective said demultiplexing ports;

a plurality of optical fiber amplifiers, each having two sides, one side of which being connected to one of the associated wavelength-dependent reflectors and each amplifier being configured to generate spontaneously emitted lights in response to pumping lights generated from the pumping-light generation section; and, a plurality of wavelength-independent reflectors, each being connected to the other side of one of the respective optical fiber amplifiers, wherein reflectance of each wavelength-dependent reflector and reflectance of each wavelength-independent reflector are controlled independently, thereby enabling optical sources to be transmitted through the respective reflectors unilaterally or bilaterally.

2. The optical source generator according to claim 1, wherein the wavelength-dependent reflectors comprise fiber-Bragg gratings which are each connected respectively to the demultiplexing ports of the wavelength-division multiplexer/demultiplexer.

3. The optical source generator according to claim 1, wherein the wavelength-dependent reflectors comprise thin film-filter reflectors which are each connected respectively to the demultiplexing ports of the wavelength-division multiplexer/demultiplexer and have respective thin film filters.

4. The optical source generator according to claim 1, wherein the optical path converter includes an optical circulator comprising:

a first port configured to input pumping lights generated from the pumping-light generation section;

a second port connected to the multiplexing port of the wavelength-division multiplexer/demultiplexer; and, a third port configured to output the wavelength-division-multiplexed optical signals.

5. The optical source generator according to claim 1, further comprising a plurality of modulators configured to use wavelength-division-multiplexed lights passing through the wavelength-independent reflectors as individual optical sources.

6. An optical source generator for wavelength-division-multiplexing optical communication systems, comprising:

a wavelength-division multiplexer/demultiplexer being provided with one multiplexing port and a plurality of demultiplexing ports, being configured to wavelength-division-multiplexing and output optical signals inputted into the multiplexing port, and being configured to wavelength-division-demultiplex and to output optical signals inputted into the demultiplexing ports;

a pumping-light generation section configured to generate and output pumping lights;

an optical path converter having a first port being configured to input pumping lights generated from the pumping-light generation section, a second pod being connected to the multiplexing port of the wavelength-division multiplexer/demultiplexer, and a third port being configured to output the wavelength-division-multiplexed optical signals;

a plurality of optical fiber amplifiers being configured to generate spontaneously emitted lights in response to pumping lights generated from the pumping-light generation section;

a first plurality of wavelength-independent reflectors, each connected to the one side of one of the respective optical fiber amplifiers;

an optical band pass filter having two sides, one side being connected to the third port of the optical path converter, the optical band pass filter being configured to pass only the optical source bands; and, a wavelength-independent reflector, other than the first plurality of wavelength-independent reflectors, being connected to the other side of the optical band pass filter, wherein the optical band pass filter is interposed between the first plurality of wavelength-independent reflectors and the wavelength-independent reflector other than the first plurality of wavelength-independent reflectors.

7. The optical source generator according to claim 6, wherein reflectance of each wavelength-independent reflectors is controlled independently, thereby enabling the optical sources to be transmitted through the respective reflectors unilaterally or bilaterally.

8. The optical source generator according to claim 1, wherein the optical source generator is configured to output light bidirectionally.

9. The optical source generator according to claim 1, wherein each of the wavelength-dependent reflectors is configured to transmit a portion of the optical signals incident upon its surface.

10. The optical source generator according to claim 1, wherein each of the wavelength-independent reflectors is configured to transmit a portion of the optical signals incident upon its surface.

11. The optical source generator according to claim 6, wherein the optical source generator is configured to output light bidirectionally.

12. The optical source generator according to claim 6, wherein each of the first plurality of wavelength-independent reflectors is configured to transmit a portion of the optical signals incident upon its surface.

13. The optical source generator according to claim 6, wherein the wavelength-independent reflector other than the first plurality of wavelength-independent reflectors is configured to transmit a portion of the optical signals incident upon its surface.

* * * * *